United States Patent [19]
Sorenson et al.

[11] Patent Number: 5,804,306
[45] Date of Patent: Sep. 8, 1998

[54] CERAMIC MATRIX COMPOSITE/ORGANIC MATRIX COMPOSITE HYBRID FIRE SHIELD

[75] Inventors: Eric Todd Sorenson, Long Beach; David Eric Daws, Los Alamitos, both of Calif.

[73] Assignee: Northrop Grumman Corporation, Los Angeles, Calif.

[21] Appl. No.: 753,655

[22] Filed: Nov. 27, 1996

[51] Int. Cl.⁶ .................. B32B 5/06; B32B 9/04; B27N 9/00; A01J 27/02
[52] U.S. Cl. .......... 428/297.4; 428/920; 428/921; 428/447; 428/311.11; 428/317.1; 428/319.1; 428/486; 428/299.1; 425/426
[58] Field of Search ................. 428/920, 921, 428/297.4, 447, 311.11, 317.1, 319.1, 486, 299.1; 425/426

[56] References Cited

U.S. PATENT DOCUMENTS 4,364,991 12/1982 Byrd et al. .................. 524/137
4,661,398 4/1987 Ellis ............................ 638/796
4,767,656 8/1988 Chee et al. .................. 428/116

*Primary Examiner*—Johann Richter
*Assistant Examiner*—Dominic Keating
*Attorney, Agent, or Firm*—Terry J. Anderson; Karl J. Hoch, Jr.

[57] ABSTRACT

The present invention is a ceramic matrix composite/organic matrix composite hybrid fire shield and the methods and processes for fabricating such a hybrid fire shield. The hybrid fire shield is comprised of an organic matrix composite substrate co-bonded with a cured-ceramic matrix composite layer made of a plurality of cured-ceramic matrix composite plies. First, the surface of the organic matrix composite is appropriately prepared to prevent delamination and enable proper bonding between the surface and the ceramic matrix composite layer. Second, the ceramic matrix composite layer is applied to the surface of the organic matrix composite. Next, the organic matrix composite with the applied ceramic matrix composite layer is processed to produce a co-bonded hybrid structure. The ceramic matrix composite layer is intended to be in direct contact with heat and flames. During impingement of the flames and heat, the cured-CMC layer pyrolyzes and converts from a polymeric to a ceramic composite material.

24 Claims, 3 Drawing Sheets

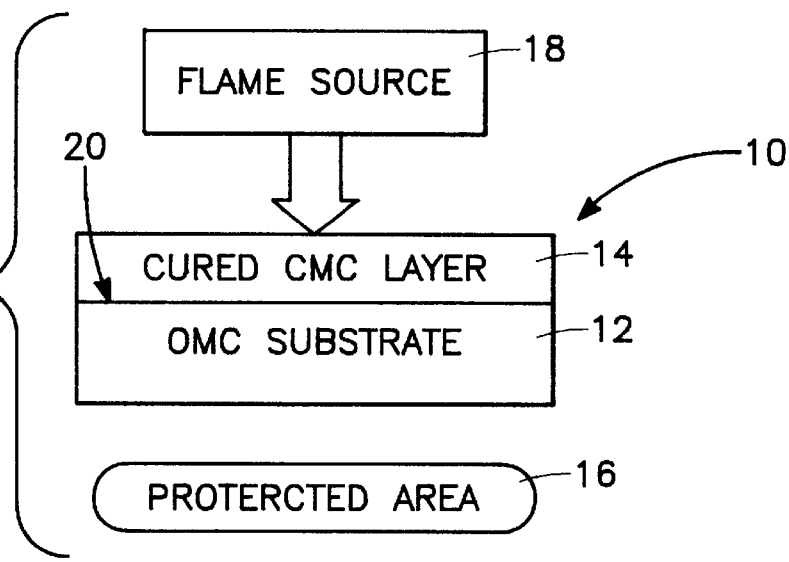
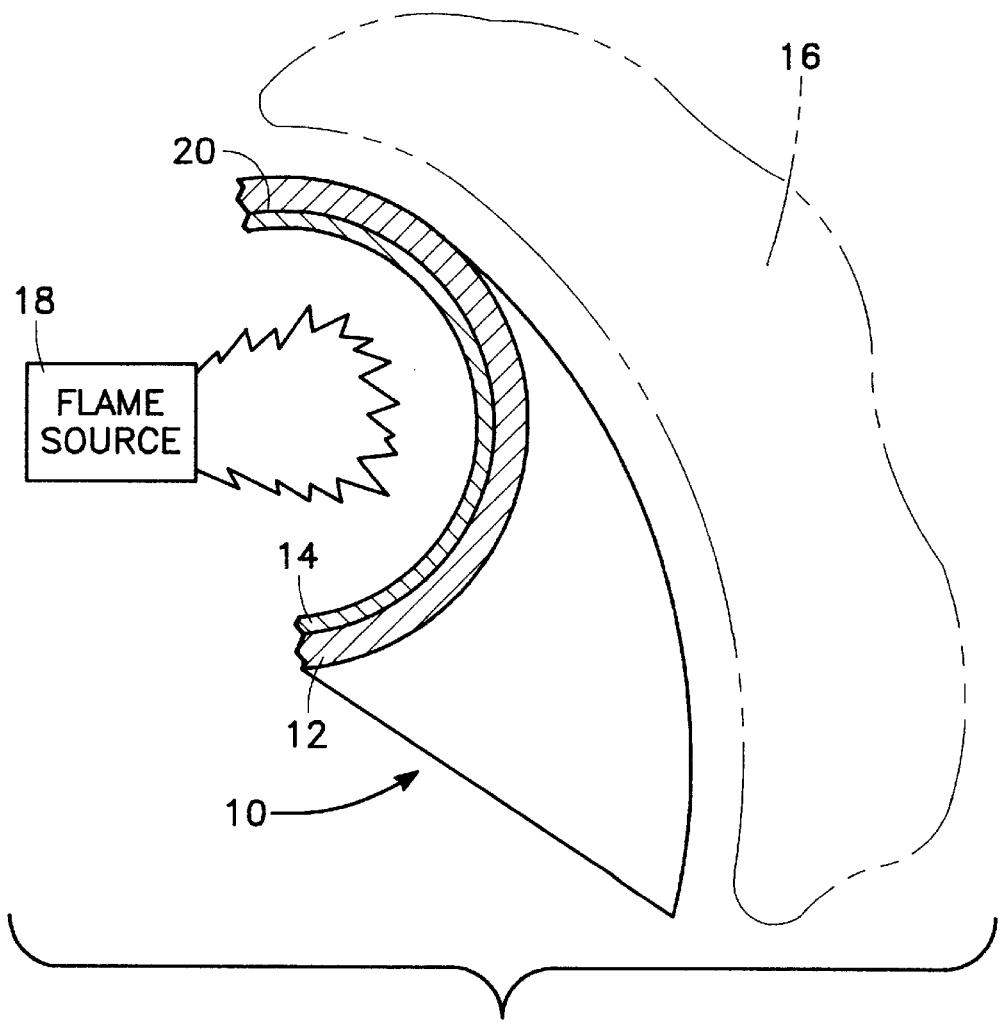

CERAMIC MATRIX COMPOSITE/ORGANIC MATRIX COMPOSITE HYBRID FIRE SHIELD

ORIGIN OF THE INVENTION

The United States Government has certain rights in this invention pursuant to Contract No. F33657-81-C-0067 awarded by the United States Air Force.

BACKGROUND OF THE INVENTION

1. Field of the Invention

The present invention relates in general to fire shields, and in particular to a ceramic matrix composite/organic matrix composite hybrid fire shield and the methods and processes for fabricating such a hybrid fire shield.

2. Related Art

Heat shields and fire shields are used to retard heat and flames produced by fires. One of the most severe conditions that a fire shield needs to withstand is uncontrolled flames and intense heat. Since the heat and fire shields typically protect critical equipment or areas from the heat generated by the flames, the fire shield must be capable of containing the flames.

For example, many aircraft utilize auxiliary power units (APU's) to provide power to the aircraft when the main engines of the aircraft are not running. These APU's are usually located in a section of the aircraft in close proximity to many critical systems. Consequently, the APU's are usually contained within protective fire shields to prevent damage to nearby critical systems should an APU failure condition occur.

In an attempt to contain the potential flames, there exists one type of fire shield comprised of heavy and very thick metal, such as stainless steel. The metallic heat shields often include an ablative coating particularly over areas where there are fasteners or joints. The ablative coatings are usually very thick to increase the time before burn-through.

However, the use of heavy and thick metal creates a fire shield that is unnecessarily massive and weighty. Also, metallic shields can be expensive if lightweight metals such as titanium are used. Next, the use of the ablative coating is inefficient since the ablative coating adds weight to the fire shield without adding any useful structure or structural reinforcement. This is because the ablative coating applied to the shield merely absorbs the heat of the flame and eventually falls off the shield after full absorption. As a result, the excess thickness of the ablative coating is purely parasitic and provides no structural contribution.

Therefore, what is needed is a protective fire shield that is relatively lightweight and can withstand heat and flames for a desired time period. What is additionally needed is a protective fire shield that is low cost. What is further needed is a protective fire shield that is comprised of structurally reinforcing material and can withstand heat and flames.

Whatever the merits of the above mentioned systems and methods, they do not achieve the benefits of the present invention.

SUMMARY OF THE INVENTION

To overcome the limitations in the prior art described above, and to overcome other limitations that will become apparent upon reading and understanding the present specification, the present invention is a ceramic matrix composite/organic matrix composite hybrid fire shield and the methods and processes for fabricating such a hybrid fire shield.

The hybrid fire shield is comprised of an organic matrix composite (OMC) substrate having an outer periphery surface and a cured-ceramic matrix composite (CMC) layer co-bonded with the outer surface. In addition, the hybrid fire shield may include a syntactic foam core. The syntactic foam creates a thermal barrier. The cured-CMC layer is comprised of a plurality of cured-ceramic matrix composite plies and is intended to be in direct contact with heat and flames.

The hybrid fire shield is fabricated by co-bonding the cured-CMC layer with the outer periphery surface of the OMC substrate. First, the surface of the OMC substrate is appropriately prepared to prevent delamination and enable proper bonding between the surface of the OMC substrate and the cured-CMC layer. Second, the cured-CMC layer is applied to the surface of the OMC substrate. Next, the OMC substrate with the applied cured-CMC layer is processed to produce a co-bonded hybrid structure.

A feature of the present invention is a lightweight CMC layer for withstanding heat and flames. Another feature of the present invention is a co-bonded structure to created a hybrid fire shield.

An advantage of the present invention is that it is relatively lightweight and can efficiently withstand heat and flames. Another advantage of the present invention is that it has structurally reinforcing properties that can withstand heat and flames. Yet another advantage of the present invention is that it relatively inexpensive.

The foregoing and still further features and advantages of the present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout:

FIG. 1 is a perspective view of one example hybrid fire shield of the present invention;

FIG. 2 is a perspective view of another example hybrid fire shield of the present invention;

DETAILED DESCRIPTION OF THE PREFERRED EMBODIMENT

Figure 3:
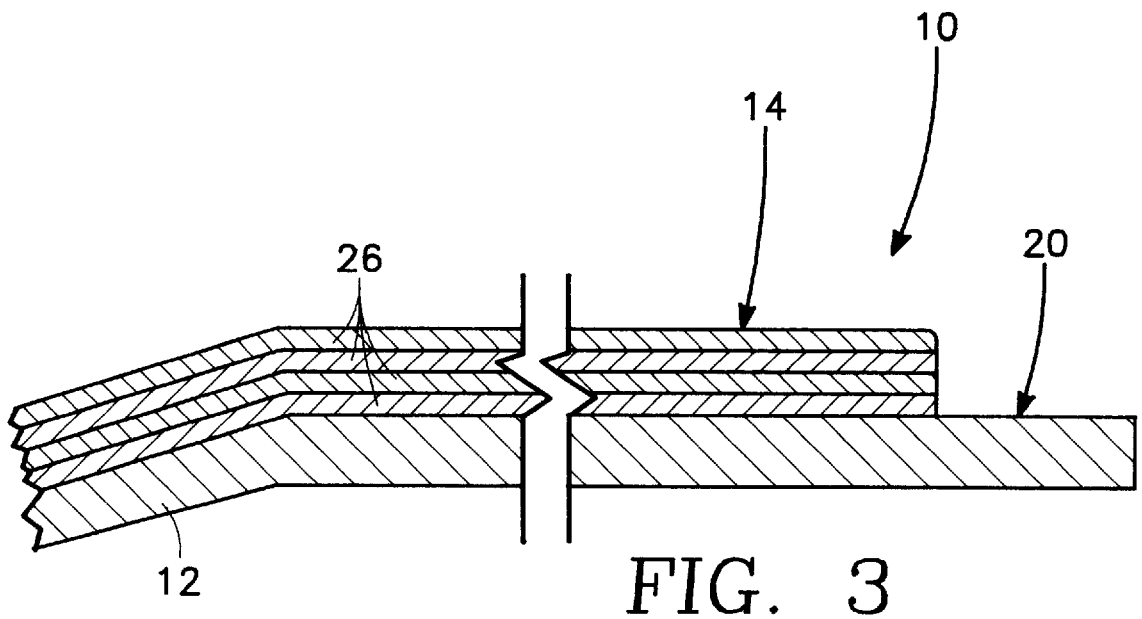
FIG. 3 is a cross-sectional side view of one embodiment of the CMC co-bonded layer of the hybrid fire shield of the present invention.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

FIG. 1 is a perspective view of one example hybrid fire shield of the present invention illustrated as a flat plate. FIG. 2 is a perspective view of another example hybrid fire shield of the present invention illustrated as a cylindrical shield.

The present invention is a ceramic matrix composite/organic matrix composite hybrid fire shield 10 comprising a organic matrix composite (OMC) substrate 12 and a co-bonded cured-ceramic matrix composite (cured-CMC) layer 14. The hybrid fire shield 10 protects critical equipment or areas 16 from heat and flames produced by a flame source 18.

FIG. 3 is a cross-sectional side view of one embodiment of the cured-CMC co-bonded layer of the hybrid fire shield of the present invention. The OMC substrate 12 has an outer periphery surface 20 and the cured-CMC layer 14 is co-bonded with the outer surface 20. The OMC substrate 12 can have a syntactic foam core (not shown) for creating an additional thermal barrier.

The OMC substrate 12 can be made of any suitable organic matrix composite, such as graphite reinforced bismaleimide, and is comprised of at least one, but preferably a plurality of organic matrix composite plies. It should be noted that the term organic matrix composite is used interchangeably with the term polymeric matrix composite (PMC). The cured-CMC layer 14 is comprised of at least one, but preferably a plurality of CMC prepreg plies 26. Each CMC prepreg ply is produced by combining one sheet of a ceramic cloth, preferably made of woven ceramic fibers, with a ceramic precursor such as a resin or a silicone based precursor to form a laminate. The CMC prepreg plies 26 are co-bonded to the surface of the OMC substrate 12 by curing the laminate for a time and at a temperature to suitably adhere the CMC prepreg plies 26 to the OMC substrate 12. When the CMC prepreg plies 26 are exposed to flames and fire, a ceramic is produced. Therefore, the CMC prepreg plies can be cured and bonded to the OMC, but not formed into the ceramic until exposed to fire.

The cured-CMC layer 14 is intended to be in direct contact with the heat and flames of the flame source 18 and can be made of a combination of different CMC plies, but are preferably made of a single or multiple identical plies of the same CMC. Such CMC's that are suitable include CO-2, an alumino-silicate matrix made by Applied Poleramic or Blackglas, a polymeric precursor CMC made by Allied Signal. The number of OMC plies depends on the structural properties desired. The number of CMC plies 26 depends on the level of flame resistance desired.

Blackglas and CO-2 are preferred CMC's because they can be processed very similarly to OMC's. For example, the cured-CMC layer 14 can be applied in its polymer state, cured to its polymeric form, and then converted to a ceramic during flame impingement. In addition, if the cured-CMC layer 14, comprised of the preferred CMC materials, is left in the cured polymer state, it will have relatively high strain to failure, greater damage tolerance, and be relatively easy to repair.

Specifically, high strain to failure is very important because during operation of, for example, an auxiliary power unit, surge conditions can cause significant deflection of fire shields. In addition, damage tolerance is important because fire shields usually must fit tightly over a protected area within an envelope. Also, during removal and replacement, it is common to hit the inside of the fire shield against nearby equipment.

Therefore, the cured-CMC layer 14 is not an ablative or parasitic material and not only provides additional heat and flame resistance characteristics to the OMC substrate 12, it also provides secondary structural reinforcement to the hybrid fire shield 10.

Figure 4:
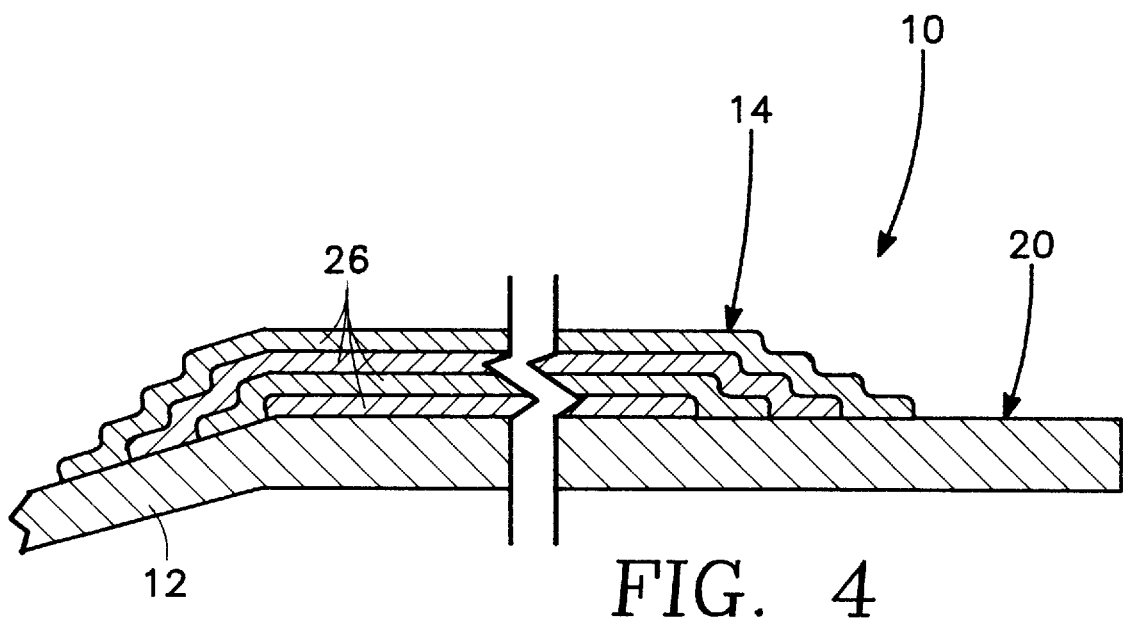
FIG. 4 is a cross-sectional side view of another embodiment of the CMC co-bonded layer with steps of the hybrid fire shield of the present invention.

FIG. 4 is a cross-sectional side view of another embodiment of the cured-CMC co-bonded layer with steps of the hybrid fire shield of the present invention. The plies 26 of the cured-CMC layer 14 can be co-bonded to the OMC substrate as stepped or staggered plies. The length of successive plies can be reduced by an appropriate dimension, depending on the size and shape of fire shield, thereby forming a stepped or staggered cured-CMC layer 14. Although the formation of the stepped CMC plies 26 is not required to produce an effective heat shield, stepping minimizes edge stress concentrations between the OMC substrate 12 and cured-CMC layer 14. Also, stepping limits delamination and peeling and provides thickness reductions of the fire shield to accommodate certain installations.

Figure 5:
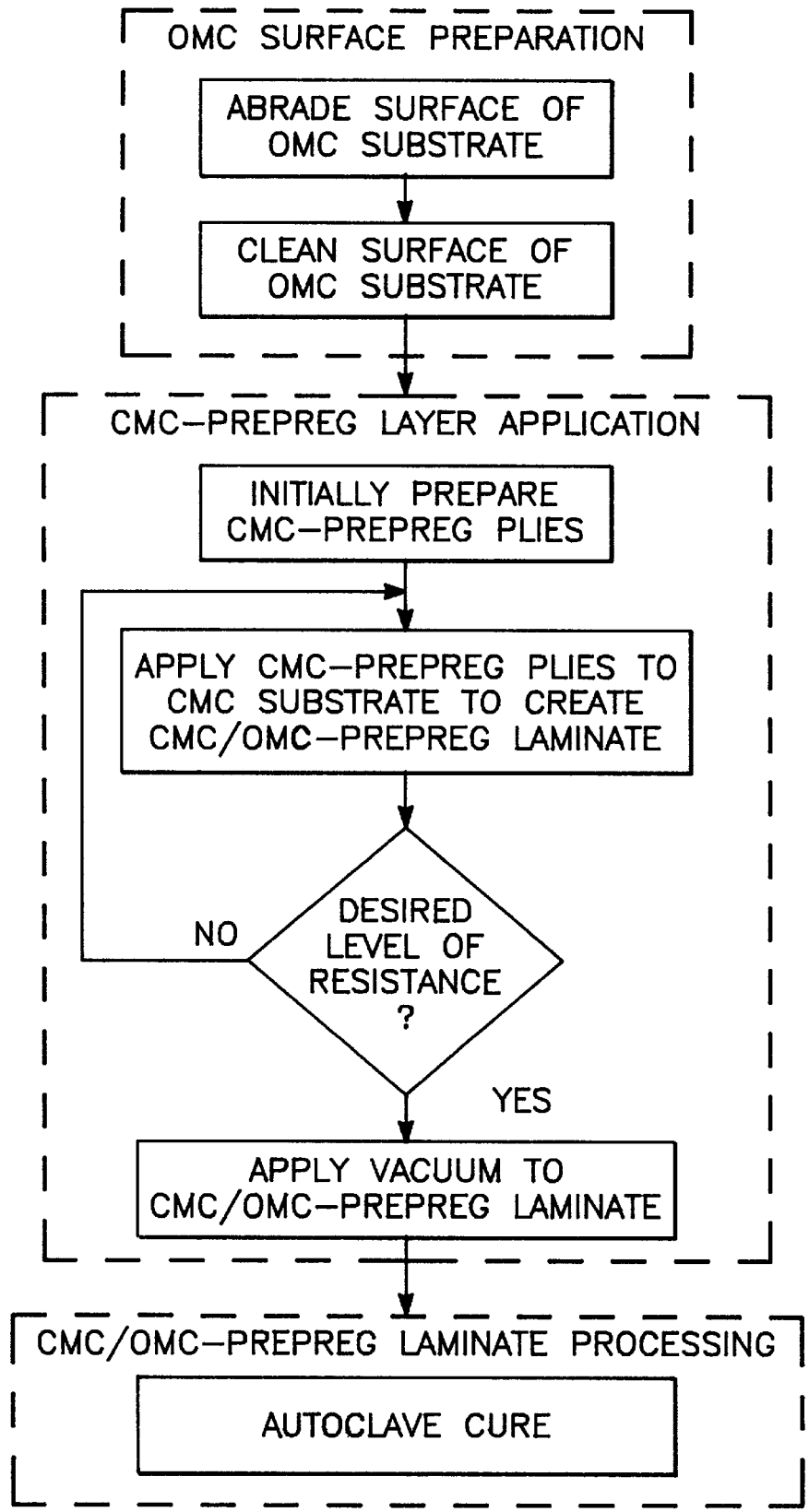
FIG. 5 is a flow chart illustrating the general steps for fabricating the hybrid fire shield in accordance with the present invention.

FIG. 5 is a flow chart illustrating the general steps for fabricating the hybrid fire shield in accordance with the present invention. Fabrication of the ceramic matrix composite/organic matrix composite (CMC/OMC) hybrid fire shield includes three separate phases, namely OMC surface preparation, CMC-prepreg layer application, and CMC/OMC-prepreg laminate processing.

OMC Surface Preparation

Referring to FIG. 5 along with FIGS. 1–4, before the cured-CMC layer 14 is applied to the OMC substrate 12, the surface of the OMC substrate 12 is prepared. First, the surface of the OMC substrate 12 is abraded at a location where the cured-CMC layer 14 is to be co-bonded to the OMC substrate 12. The abrading step enhances the bond between the OMC substrate 12 and the cured-CMC layer 14 by increasing the surface bonding area on the surface of the OMC substrate 12 and causing a roughening of the surface at the location where cured-CMC layer 14 is to be applied. This prevents delamination of the cured-CMC layer 14 from the OMC substrate 12. A medium-grit sandpaper, such as −30 to +240 grit sandpaper (preferably 80 grit sandpaper) can be used to abrade the surface.

Second, the surface of the OMC substrate 12 is cleaned. Cleaning eliminates any dirt contaminates that may hinder the bonding between the surface OMC substrate 12 and the cured-CMC layer 14. The surface of the OMC substrate 12 can be cleaned using any solvent suitable to clean the abraded area on the OMC substrate 12 without damaging the surface of the OMC substrate 12. Isopropyl alcohol is the preferred solvent, but solvents such as ethanol, methanol, etc. can be used.

CMC-Prepreg Layer Application

After surface preparation of the OMC substrate 12, the cured-CMC layer 14 is applied to the OMC substrate 12. The cured-CMC layer 14 is comprised of a plurality of CMC plies made of CMC-prepreg. First, the CMC-prepreg plies are initially prepared by pre-storing the plies. For example, suitable storage includes storing the CMC-prepreg plies in a freezer in a waterproof storage bag, which is necessary to prevent premature curing. Also, before CMC-prepreg application, the CMC-prepreg plies are preferably allowed to warm to room-temperature without condensed moisture from the atmosphere infiltrating the CMC-prepreg plies.

Second, the CMC-prepreg plies are laid across the surface of the OMC substrate 12 and pressed onto the surface to ensure a uniform bond between the two materials, by for example, mechanical means. An appropriate number of CMC-prepreg plies are applied to the surface of the OMC substrate 12 until the desired level of fire resistance is achieved to produce a CMC/OMC-prepreg laminate. As shown in FIG. 4, the CMC-prepreg plies can applied as steps to minimize stress concentrations between the OMC substrate 12 and the CMC layer 14 and/or to allow thickness reductions for installation purposes.

An air gap is created between the cured-CMC layer 14 coating and the OMC substrate 12 during flame impingement. This is caused by the cured-CMC layer 14, in the polymeric state, shrinking during conversion to the ceramic state. This air gap creates an excellent insulator. Further, the CMC layer 14 can be anchored to or hooked around both or either ends of the OMC substrate. This ensures that if the CMC layer 14 shrinks during flame impingement, the CMC layer 14 will disbond to create an air gap, rather than peel off the surface of the OMC substrate 12.

Third, vacuum means is applied to the CMC/OMC-prepreg laminate to enable curing and co-bonding of the CMC-prepreg to the surface of the OMC substrate 12. One specific example is vacuum bagging. This entails placing the CMC/OMC-prepreg laminate on a tool with a release film, such as Teflon. Next, one ply of perforated fluorinated ethylene polymer (FEP), two plies of 7781 fiberglass, one ply of non-porous armalon, and one or two plies of airweave are placed in succession on top of the CMC/OMC-prepreg laminate. The CMC/OMC-prepreg laminate is then wrapped in a plastic bagging material and a full vacuum is applied and maintained on the bagged part.

CMC/OMC-Prepreg Laminate Processing

After CMC-prepreg layer application, the CMC/OMC-prepreg laminate must be processed to produce a co-bonded structure, so that the CMC-prepreg layer cures and sets to form a polymeric-type composite material. CMC/OMC-prepreg laminate processing includes curing the CMC-prepreg to form a bond between the cured-CMC-prepreg and the OMC substrate 12. As a result, a new co-bonded CMC/OMC hybrid material is formed.

The CMC/OMC-prepreg laminate is autoclave cured. One specific example cure schedule includes the following steps:
1) Place the vacuum-bagged CMC/OMC-prepreg laminate within a suitable autoclave;
2) Apply 60 psi immediately, allowing the autoclave air temperature to rise;
3) Vent the vacuum at 10 psi autoclave pressure;
4) Heat from room-temperature to 220 degrees F. (105 degrees C.) over a 15 minute time span (10 degrees F./minute, 5 degrees C./minute);
5) Hold at 220 degrees F. (105 degrees C.) for 15 minutes;
6) Heat from 220 degrees F. to 300 degrees F. (150 degrees C.) over 15 minutes (5 degrees F./minute, 3 degrees C./minute);
7) Hold at 300 degrees F. for 30 minutes;
8) Cool to 150 degrees F. (65 degrees C.) at 5–10 degrees F./minute (3–5 degrees C. minute), then cool to room temperature;
9) Remove the completed cured-CMC/OMC structure from the furnace; and
10) Remove all bagging material.

It should be noted that this cure cycle is just an example. Any cycle suitable for effective curing of the CMC-prepreg can be used as long as no damage occurs to the either the CMC-prepreg or OMC substrate 12. The co-bonded cured-CMC layer 14 converts to a ceramic during flame impingement. When flame impinges on the cured-CMC layer 14, the pyrolysis process begins, converting the polymer to a ceramic.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A hybrid fire shield comprising:
a cured ceramic matrix composite layer co-bonded to a primary substrate derived by (a) producing at least one prepreg ply by combining one sheet of a ceramic cloth with a ceramic precursor capable of forming a ceramic matrix, (b) applying said at least one prepreg ply to a surface of said primary substrate to form a laminate, and (c) co-bonding said at least one prepreg ply to said surface of said primary substrate by curing said laminate for a time and at a temperature to suitably adhere said at least one prepreg ply to said primary substrate.

2. The invention as set forth in claim 1, wherein said ceramic cloth is made of woven ceramic fibers.

3. The invention as set forth in claim 1, wherein said ceramic precursor is a pre-ceramic resin.

4. The invention as set forth in claim 1, wherein said ceramic precursor is a silicone based precursor.

5. The invention as set forth in claim 1, wherein said primary substrate is an organic matrix composite.

6. The invention as set forth in claim 4, wherein said organic matrix composite substrate has a syntactic foam core.

7. The invention as set forth in claim 1, wherein said ceramic matrix composite is alumino-silicate matrix.

8. The invention as set forth in claim 5, wherein said organic matrix composite is graphite reinforced bismaleimide.

9. A hybrid fire shield comprising:
a primary substrate;
a cured ceramic matrix composite layer comprising at least one prepreg ply made of one sheet of a ceramic cloth infiltrated with a ceramic precursor capable of forming a ceramic matrix; and
wherein said at least one prepreg ply is adhered to a surface of said primary substrate so that said cured ceramic matrix composite layer is co-bonded to said primary substrate.

10. The invention as set forth in claim 9, wherein said ceramic cloth is made of woven ceramic fibers.

11. The invention as set forth in claim 9, wherein said ceramic precursor is a pre-ceramic resin.

12. The invention as set forth in claim 9, wherein said ceramic precursor is a silicone based precursor.

13. The invention as set forth in claim 9, wherein said primary substrate is an organic matrix composite.

14. The invention as set forth in claim 13, wherein said organic matrix composite substrate has a syntactic foam core.

15. The invention as set forth in claim 9, wherein said ceramic matrix composite is alumino-silicate matrix.

16. The invention as set forth in claim 13, wherein said organic matrix composite is graphite reinforced bismaleimide.

17. A method fox producing a hybrid fire shield made of a cured ceramic matrix composite layer co-bonded to a primary substrate, comprising the steps of:
(a) combining one sheet of a ceramic cloth with a ceramic precursor, capable of forming a ceramic matrix, to produce at least one prepreg ply;
(b) applying said at least one prepreg ply to a surface of said primary substrate to form a laminate;
(c) curing said laminate for a time and at a temperature to suitably adhere said at least one prepreg ply to said primary substrate so that said at least one prepreg ply is co-bonded to said surface of said primary substrate.

18. The method of claim 17, further comprising, after step (a) and before step (b) the steps of:
  (a1) abrading the surface of said primary substrate; and
  (a2) cleaning the surface of said primary substrate.

19. A hybrid fire shield comprising:
  a cured ceramic matrix composite layer co-bonded to a primary substrate derived by (a) producing at least one prepreg ply by combining one sheet of a ceramic cloth with a ceramic precursor, (b) applying said at least one prepreg ply to a surface of said primary substrate to form a laminate, and (c) co-bonding said at least one prepreg ply to said surface of said primary substrate by curing said laminate for a time and at a temperature to suitably adhere said at least one prepreg ply to said primary substrate;
  said ceramic precursor being a silicone based precursor; and
  said organic matrix composite substrate having a syntactic foam core.

20. A hybrid fire shield comprising:
  a cured ceramic matrix composite layer co-bonded to a primary substrate derived by (a) producing at least one prepreg ply by combining one sheet of a ceramic cloth with a ceramic precursor, (b) applying said at least one prepreg ply to a surface of said primary substrate to form a laminate, and (c) co-bonding said at least one prepreg ply to said surface of said primary substrate by curing said laminate for a time and at a temperature to suitably adhere said at least one prepreg ply to said primary substrate; and
  said ceramic matrix composite being alumino-silicate matrix.

21. A hybrid fire shield comprising:
  a cured ceramic matrix composite layer co-bonded to a primary substrate derived by (a) producing at least one prepreg ply by combining one sheet of a ceramic cloth with a ceramic precursor, (b) applying said at least one prepreg ply to a surface of said primary substrate to form a laminate, and (c) co-bonding said at least one prepreg ply to said surface of said primary substrate by curing said laminate for a time and at a temperature to suitably adhere said at least one prepreg ply to said primary substrate;
  said primary substrate being an organic matrix composite; and
  said organic matrix composite being graphite reinforced bismaleimide.

22. A hybrid fire shield comprising:
  a primary substrate;
  a cured ceramic matrix composite layer comprising at least one prepreg ply made of one sheet of a ceramic cloth infiltrated with a ceramic precursor;
  wherein said at least one prepreg ply is adhered to a surface of said primary substrate so that said cured ceramic matrix composite layer is co-bonded to said primary substrate;
  said primary substrate being an organic matrix composite; and
  said organic matrix composite substrate having a syntactic foam core.

23. A hybrid fire shield comprising:
  a primary substrate;
  a cured ceramic matrix composite layer comprising at least one prepreg ply made of one sheet of a ceramic cloth infiltrated with a ceramic precursor;
  wherein said at least one prepreg ply is adhered to a surface of said primary substrate so that said cured ceramic matrix composite layer is co-bonded to said primary substrate; and
  said ceramic matrix composite being alumino-silicate matrix.

24. A hybrid fire shield comprising:
  a primary substrate;
  a cured ceramic matrix composite layer comprising at least one prepreg ply made of one sheet of a ceramic cloth infiltrated with a ceramic precursor;
  wherein said at least one prepreg ply is adhered to a surface of said primary substrate so that said cured ceramic matrix composite layer is co-bonded to said primary substrate;
  said primary substrate being an organic matrix composite; and
  said organic matrix composite being graphite reinforced bismaleimide.

\* \* \* \* \*